US007248949B2

(12) United States Patent
Love et al.

(10) Patent No.: US 7,248,949 B2
(45) Date of Patent: Jul. 24, 2007

(54) SYSTEM AND METHOD FOR STOCHASTIC AIRCRAFT FLIGHT-PATH MODELING

(75) Inventors: W. Dwight Love, Herndon, VA (US); Michael P. McLaughlin, McLean, VA (US); Roland O. Lejeune, Fairfax, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

(21) Appl. No.: 10/970,279

(22) Filed: Oct. 22, 2004

(65) Prior Publication Data

US 2006/0089760 A1 Apr. 27, 2006

(51) Int. Cl.
*G08G 7/00* (2006.01)
*G01S 3/00* (2006.01)

(52) U.S. Cl. ........................................ 701/4; 342/33

(58) Field of Classification Search .................... 701/4, 701/3, 5, 7, 10, 11, 200, 201, 202, 203, 205; 342/26 R, 33, 34; 244/164; 73/178 R
See application file for complete search history.

(56) References Cited

U.S. PATENT DOCUMENTS 4,563,743 A * 1/1986 Murphy et al. ................ 701/4
5,457,634 A * 10/1995 Chakravarty ................... 701/3
5,596,332 A * 1/1997 Coles et al. ................ 342/455
5,961,568 A * 10/1999 Farahat ....................... 701/120
6,134,500 A * 10/2000 Tang et al. ................. 701/202
6,201,482 B1 * 3/2001 Schiefele et al. ........... 340/961
6,393,358 B1 * 5/2002 Erzberger et al. ........... 701/120
6,421,603 B1 * 7/2002 Pratt et al. .................. 701/206
6,662,086 B2 * 12/2003 Lemelson et al. ............. 701/3
2004/0078136 A1 * 4/2004 Cornell et al. .............. 701/120

* cited by examiner

*Primary Examiner*—Dalena Tran
(74) *Attorney, Agent, or Firm*—Sterne Kessler Goldstein & Fox PLLC

(57) ABSTRACT

Stochastic models of aircraft flight paths and a method for deriving such models from recorded air traffic data. Each stochastic model involves identifying the flight plan for one or more aircraft; identifying important parameters from each flight plan, such as aircraft type, cruise altitude, and airspeed; optionally identifying flight plan amendments for each flight; representing each route of flight as a series of navigational fixes; representing at least one aircraft flight parameter probabilistically; modeling realistic differences in at least one dimension between each planned route of flight and the flight path as it might actually be flown; and communicating the modeled deviations or simulated flight paths to the user. At least one aircraft flight parameter is represented as a random variable with a particular statistical distribution, such as a normal (Gaussian), Laplacian, or logistic distribution; or with a more complex algorithm containing one or more random elements. The modeled flight parameters may be any of lateral position, longitudinal position, climb altitude, descent altitude, climb airspeed, descent airspeed, cruise airspeed, cruise altitude transition, or response time to a flight plan amendment.

23 Claims, 9 Drawing Sheets

SYSTEM AND METHOD FOR STOCHASTIC AIRCRAFT FLIGHT-PATH MODELING

STATEMENT REGARDING FEDERALLY-SPONSORED RESEARCH AND DEVELOPMENT

Statement under MPEP 310. The U.S. government has a paid-up license in this invention and the right in limited circumstances to require the patent owner to license others on reasonable terms as provided for by the terms of contracts Nos. DTFA01-93-C-00001 and DTFA01-01-C-00001, awarded by the Federal Aviation Administration.

BACKGROUND OF THE INVENTION

1. Field of the Invention

The present invention relates to decision support tools for air traffic control (ATC) and to simulation and modeling of air traffic.

2. Related Art

In modern ATC systems, operational personnel use various decision support tools (DSTs) for aircraft route planning and for keeping aircraft safely separated as they move from origin to destination. Many of these tools include a trajectory modeling function to predict the future positions and altitudes of aircraft. Examples of such DSTs in the United States include the Collaborative Routing Coordination Tools (CRCT), the Center-TRACON Automation System (CTAS), En Route Automation Modernization (ERAM), the Enhanced Traffic Management System (ETMS), and the User Request Evaluation Tool (URET). Some of these tools are in operational use, while others are currently being used as development platforms for future ATC capabilities.

CRCT is the prototype of a set of decision support capabilities to assist traffic managers in formulating flow management strategies. CRCT generates trajectories and uses them to predict sector counts (i.e., the number of aircraft that will occupy each ATC sector during a future time interval) and to determine which aircraft might penetrate a problematic block of airspace known as a “flow constrained area.” CTAS is a suite of decision support tools designed to assist ATC personnel in air traffic management. CTAS tools rely on trajectory modeling to schedule and sequence aircraft for efficient and conflict-free delivery to the terminal area.

ERAM is a program to replace the existing software and hardware at en route ATC centers with a more modern architecture. Under ERAM, trajectory modeling is needed to support flight data processing and flight plan preprocessing. Among other things, ETMS provides air traffic managers with a capability called “monitor/alert,” which predicts airport, fix, and sector counts for 15-minute intervals. URET is a tool to help en route controllers detect and resolve impending aircraft-aircraft and aircraft-airspace conflicts. Using flight plan and radar track data, URET builds a trajectory for each aircraft, and uses these trajectories to predict if any pair of aircraft will be in conflict within the next 20 minutes, or if an aircraft will come within a parameter distance of special-use airspace.

Uncertainty is an inherent part of any air traffic system. The positions and altitudes of aircraft are not measured with perfect accuracy. Furthermore, aircraft trajectories are subject to random variations due to weather, navigational error, wind prediction errors, and so forth. Therefore, a well-designed DST must be tolerant to uncertainty. This is accomplished in various ways. For example, in predicting aircraft-aircraft conflicts, URET protects a region around the nominal trajectory of each flight by defining a set of “conformance bounds”—imaginary containment bounds at a certain distance from the nominal trajectory, within which the actual flight track is assumed to reside. If an aircraft’s radar track moves outside of the current conformance bounds, the trajectory for that flight is rebuilt. If the conformance bounds for two different flights overlap in space and time, URET may issue a conflict alert to the controller.

This is illustrated in FIG. 1, in which the nominal trajectories of two aircraft are represented by 102A and 102B. The dashed lines 104A and 104B represent the lateral conformance bounds for the trajectories. Note that there are also vertical conformance bounds, not shown in the figure. Region 108, where the conformance bounds overlap, is where the two aircraft might generate an alert. The ideal span of URET’s conformance bounds is a tradeoff between the need to keep aircraft safely separated and the need to use limited airspace efficiently. In principle, the conformance bounds could be adjusted according to current conditions (navigational equipment in use, planned maneuvers, etc.) to provide just the right amount of protection at any point along a route. However, parameters for controlling the size of such conformance bounds must be optimized by extensive testing with recorded and/or simulated air traffic.

In addition to the decision support tools listed above, a number of simulation and modeling tools (SMTs) have been developed over the years to model air traffic, as well as elements of the ATC system, in selected regions of airspace. These tools are used to evaluate and refine DSTs, to support airspace redesign, and to predict the effects of proposed changes to the ATC system on system performance. Examples of such tools include the National Airspace System Performance Analysis Capability (NASPAC), the Sector Design and Analysis Tool (SDAT), the Reorganised Mathematical ATC Simulator (RAMS), the Total Airspace and Airport Modeller (TAAM), and the Detailed Policy Assessment Tool (DPAT). Generally, SMTs model aircraft flights either by using a trajectory modeler to synthesize trajectories, or by “replaying” actual recorded tracks.

A desirable capability for an SMT is the ability to model uncertainty in aircraft positions and altitudes. For example, NASPAC can model such uncertainty to a degree by replacing nominal predicted trajectories (produced by a trajectory modeler) with actual recorded tracks for the same origins and destinations, selected randomly from a limited data base of such tracks (usually recorded on a single day). With this scheme, a certain amount of variation can be modeled, especially for city pairs for which there is a high level of air traffic. However, an extremely large data base of tracks would be required to assure representative variations over a wide range of weather conditions and for less heavily traveled routes.

In developing and testing DSTs, and in using SMTs effectively, the choice of a method for modeling air traffic often comes down to the replaying of recorded tracks vs. the synthesis of aircraft trajectories by a trajectory modeler. As mentioned in the NASPAC example above, the use of recorded tracks can allow uncertainty to be modeled to a limited extent. A high level of confidence in the results generally requires many computer runs with different sets (days) of recorded traffic data. In addition, the use of recorded tracks has a major limitation that is especially significant for the analysis of aircraft-aircraft and aircraft-airspace conflicts: in the recorded traffic data, conflicts are virtually always resolved by controller intervention. Hence, almost no recorded conflicts exhibit an actual violation of separation rules. Therefore, it becomes difficult to estimate what the outcome of a conflict would have been (for example, the minimum separation between two aircraft) if no outside intervention had occurred. This is not a problem with simulated trajectories, in which the a priori outcome is known accurately (by construction). However, simulated trajectories have a limitation of their own: they normally do not exhibit variations that are typical of the real world. This is because trajectory modelers are generally deterministic in nature; that is, given a specific set of initial conditions, the modeler will always produce the same result. Ideally, a trajectory modeler should be capable of simulating random variations that are typical of real aircraft trajectories. It is in this regard that the present invention fills a void.

SUMMARY OF THE INVENTION

The present invention includes a set of stochastic aircraft flight-path models and a method of deriving such models from recorded air traffic data. The use of these models substantially obviates one or more of the disadvantages of the related art.

More particularly, in an exemplary embodiment of the present invention, a method of simulating aircraft flight paths includes identifying the planned route of flight for an aircraft; modeling realistic deviations from the planned route by representing at least one aircraft flight parameter probabilistically; and communicating the simulated flight path to a user. The aircraft flight parameter can be represented as a random variable with a specified statistical distribution, such as a normal (Gaussian) or Laplacian distribution, or it can be derived through the use of a specified algorithm containing random elements. The aircraft flight parameter can be, for example, lateral position, longitudinal position, climb altitude, descent altitude, climb airspeed, descent airspeed, cruise airspeed, cruise altitude transition, forecast wind vector, response time to a flight plan amendment, or some combination of the above.

The flight models described herein can be used to develop DSTs and other flight guidance systems that allow airspace to be used more safely and efficiently. In particular, aircraft flight routes can be optimized to reduce proximity alerts, minimize flight time, and/or reduce flight delays. Also, conflict detection and resolution parameters, such as conflict notification time and maneuver turn angle, can be optimized to provide the least disruptive resolution maneuvers that will ensure safe separation. Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

Figure 9:
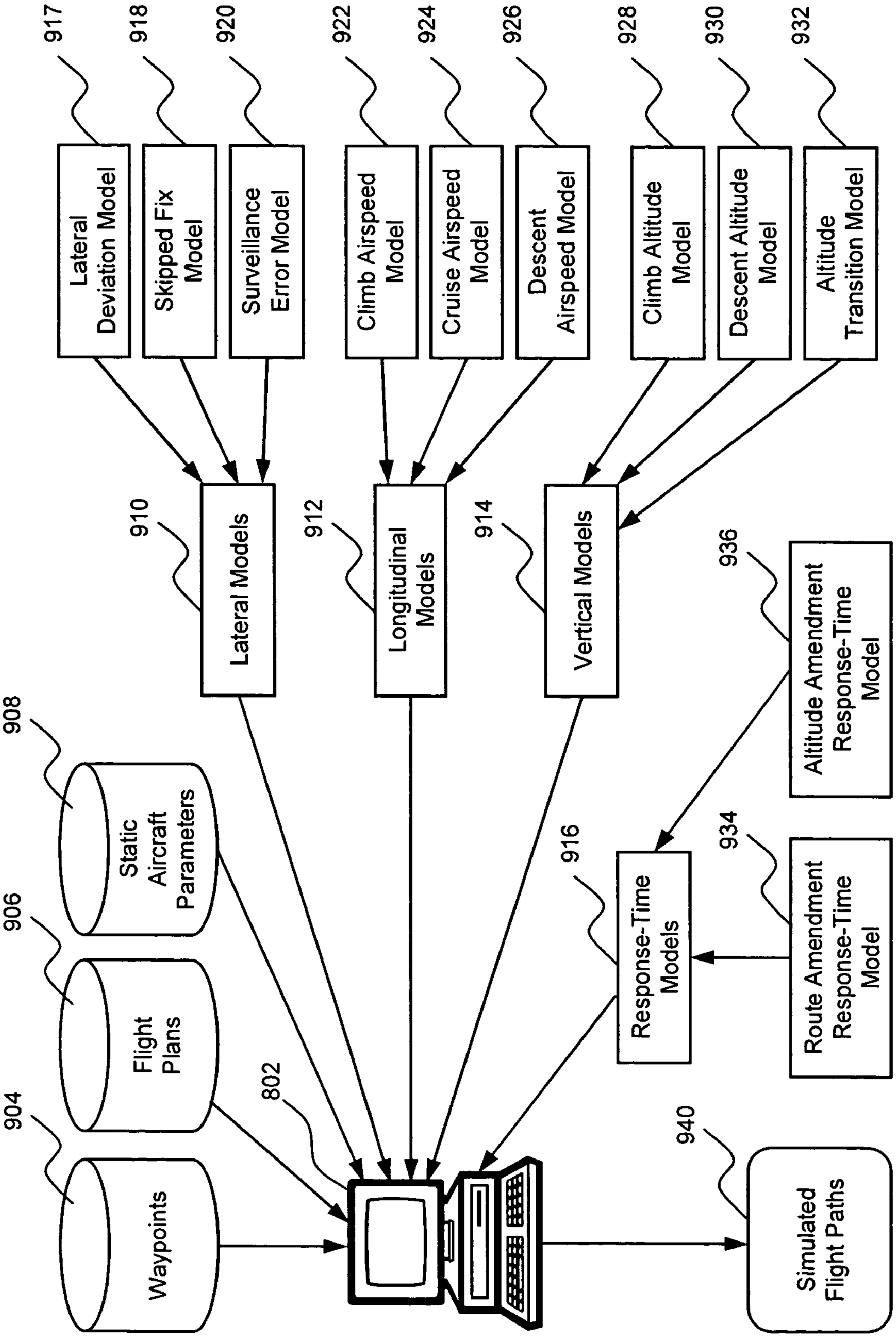
FIG. 9 shows a system diagram of a particular implementation of the present invention.

The present invention utilizes stochastic methods to model realistic variations in aircraft flight paths. These methods can be used to help evaluate decision support systems that are used in the air traffic control system, or, more generally, to produce air traffic scenarios composed of many simulated flights. The stochastic models assess how well different types of aircraft follow their planned routes. FIG. 9 shows a system-level diagram of how the present invention may be implemented in the form of computer algorithms to produce simulated flight paths. In one embodiment, simulated flight paths 940 are generated based on any or all of the waypoints 904, flight plans 906, static aircraft parameters 908, lateral models 910, longitudinal models 912, vertical models 914 and response time models 916, as described further below.

Figure 1:
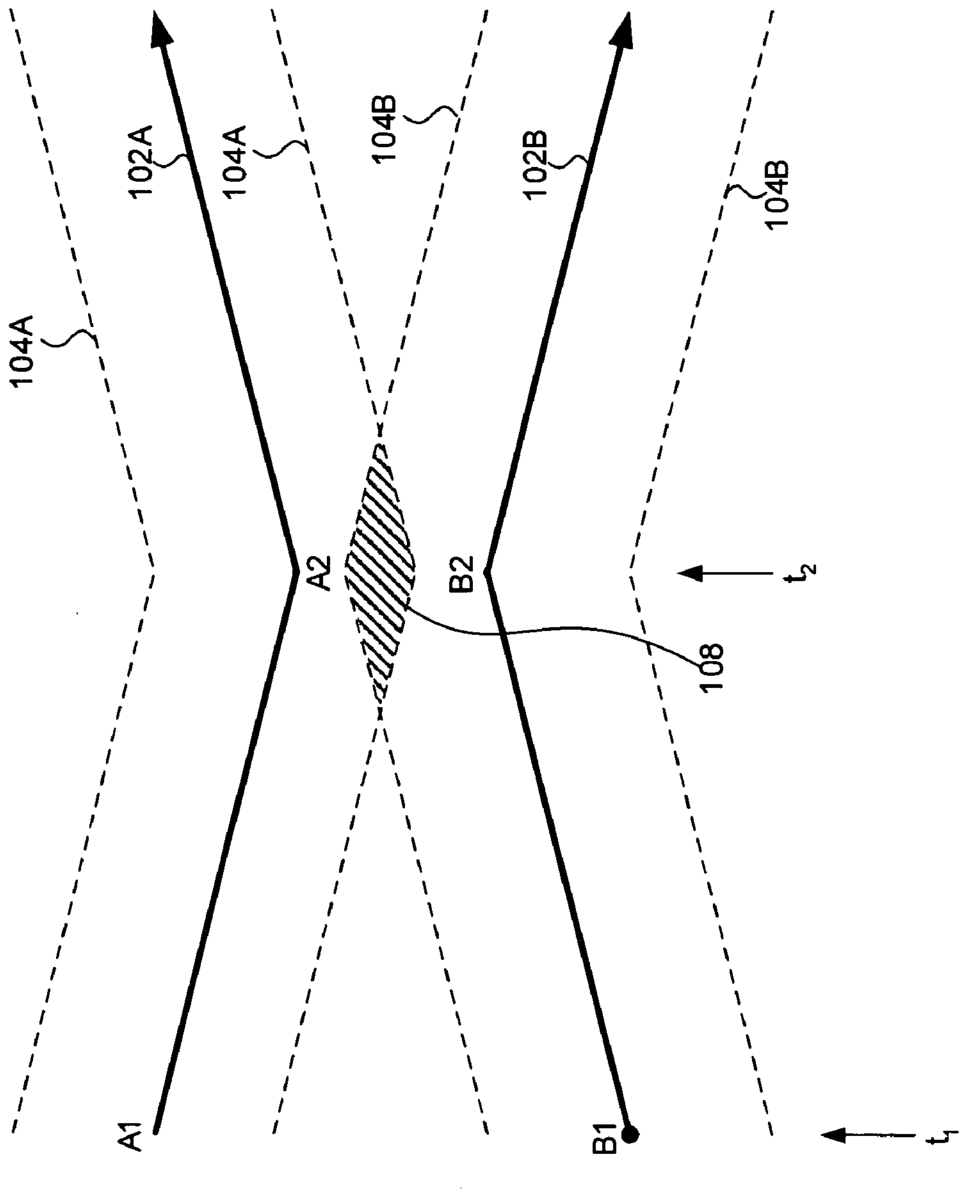
FIG. 1 illustrates how a conflict alert may be generated.
Figure 2:
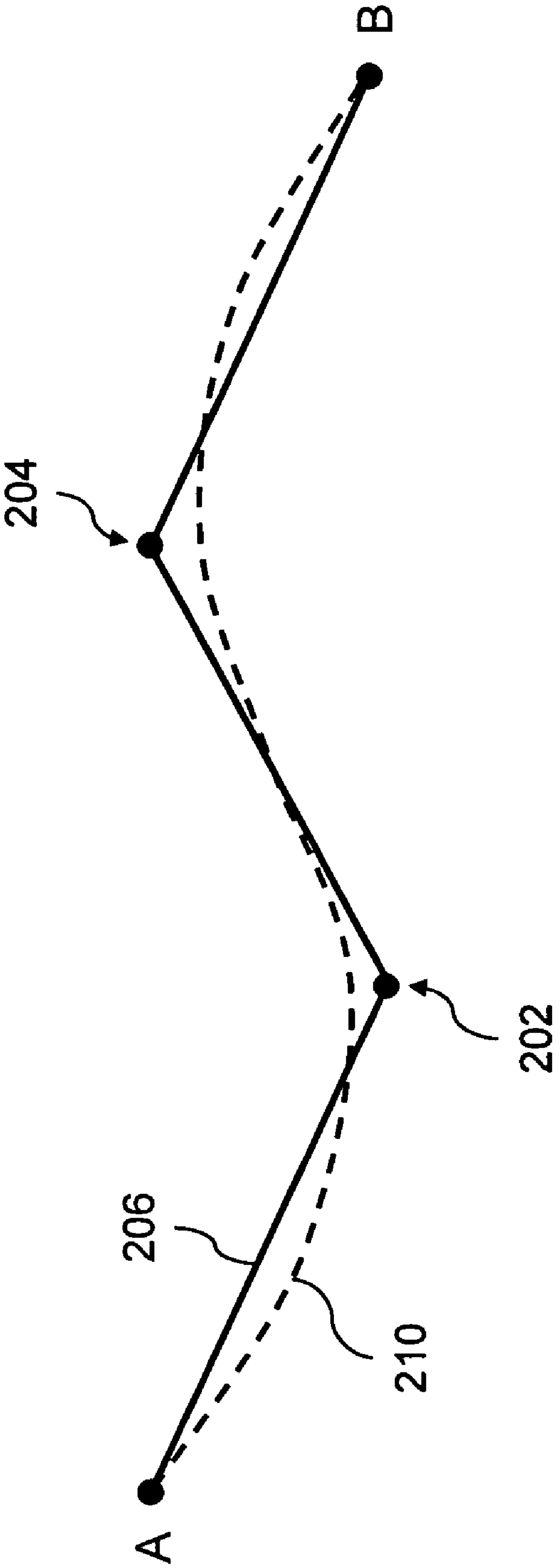
FIG. 2 shows an aircraft traveling along a route connecting two cities.

FIG. 2 shows an aircraft traveling from city A to city B along a particular route of flight 206. The aircraft normally has to pass above certain waypoints along the way. In the example of FIG. 2, two waypoints 202, 204 are illustrated. In reality, the aircraft does not follow the perfect path designated by 206, but will deviate somewhat from the planned route, perhaps following a path such as that designated by 210. The amount of deviation from the planned path is a statistical quantity, and generally varies by type of aircraft, weather, as well as numerous other factors. In other words, the elements of the flight path 206 in FIG. 2 need to be treated as statistical quantities, with a certain distribution (in both the vertical and lateral dimensions) as well as in time (the longitudinal dimension), to accurately model real air traffic events.

Unlike most conventional approaches, which include only deterministic flight paths, the present invention uses probability distributions and probabilistic models to represent variations in aircraft flight paths that are more typical of the real world (see 940 in FIG. 9). A number of different probabilistic models may be used, either singly or in combination, to model aircraft flight parameters and flight paths. These include models representing uncertainty in the three spatial flight dimensions—lateral (910), longitudinal (912), and vertical (914)—along with models for typical pilot/controller delays in posting and responding to flight plan amendments (916). A major advantage of these empirical models in analyzing decision support tools is that they permit an independent evaluation of performance—one that does not depend to any significant degree on the system or algorithms being evaluated.

The flight models are stochastic models designed to emulate how aircraft actually follow their flight plans and amendments. They were empirically derived from many hours of actual air traffic data, although the invention is not limited to this. The mathematical functions, probability distributions, and numeric parameters for each model were chosen to provide a good fit to the empirical data. The flight models that have been developed are described below. They include spatial models (lateral (910), longitudinal (912), and vertical (914)) and response-time models (916). The spatial models exhibit a moderate level of fidelity to the real world; as a general rule, they do not model short-term variations in their associated flight parameters. (However, higher-fidelity models can be readily produced, if needed, as would be understood by one of ordinary skill in the art.) Note that in the discussions below, the term "airspeed" always refers to true airspeed.

To illustrate the principles and operation of the invention, the flight models are described herein with particularity, including specific numeric values and ranges. It should be understood that these numbers illustrate a specific representative implementation of the invention. The invention, however, is not limited to these particular numeric values and ranges. A person skilled in the relevant art will recognize that these numeric values and ranges can be changed to better suit specific circumstances and needs. In fact, this is another major advantage of this approach to flight modeling. Furthermore, a person skilled in the art will also recognize that different equations can be used to represent the exemplary flight models described herein.

The lateral models include a lateral deviation model (917), a "skipped fix" model (918), and a surveillance error model (920). Each of these is described below.

The lateral deviation model (917) produces realistic differences between a reference trajectory, usually defined by a flight's cleared route of flight, and the aircraft's actual flight path.

Figure 3:
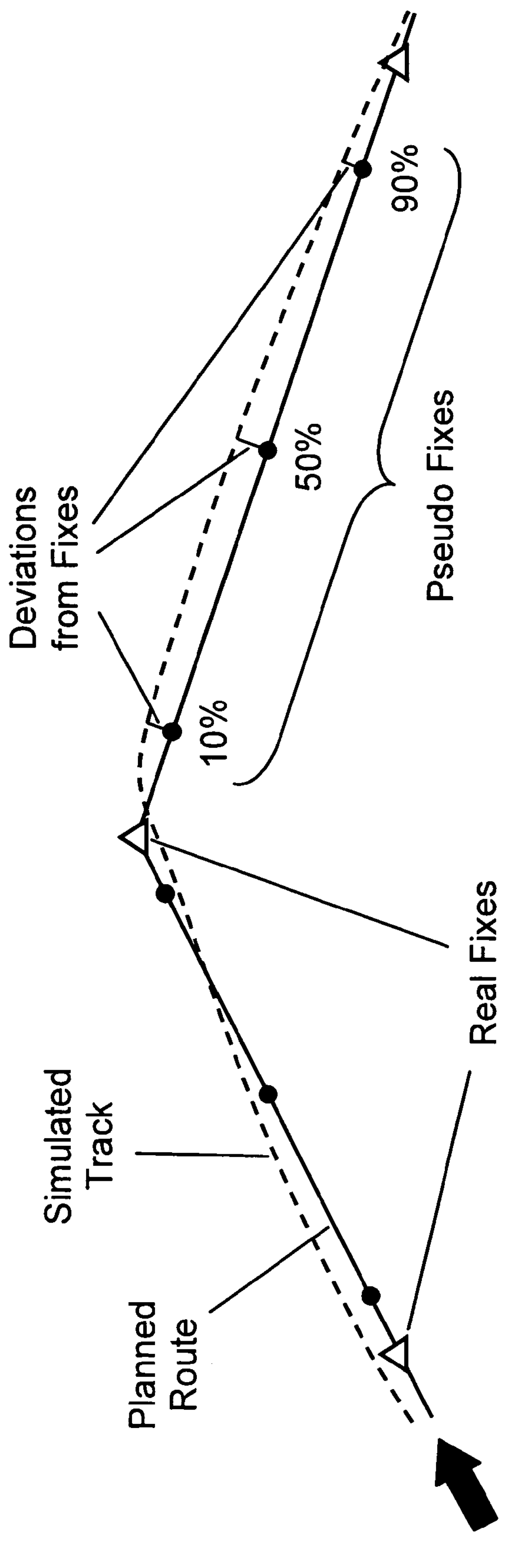
FIG. 3 shows how "pseudo" fixes are inserted between real fixes of a flight path.

The lateral deviation model (917) begins with a list of the navigation fixes along the cleared route for a flight. Each navigation fix is specified by a pair of X, Y coordinates. The model then inserts up to (e.g.) three "pseudo" fixes between the real fixes, at (e.g.) the 10%, 50% and 90% points. This is illustrated in FIG. 3. The 10% and 90% pseudo fixes help to produce realistic turns at "bends" in the route. Some or all of the pseudo fixes may be omitted if two real fixes are close together. Specifically, if the distance between two real fixes is less than (e.g.) 25 nautical miles, then the 10% and 90% pseudo fixes will not be inserted. The 50% pseudo fix is also omitted if the distance is less than, e.g., 10 nautical miles.

Figure 4:
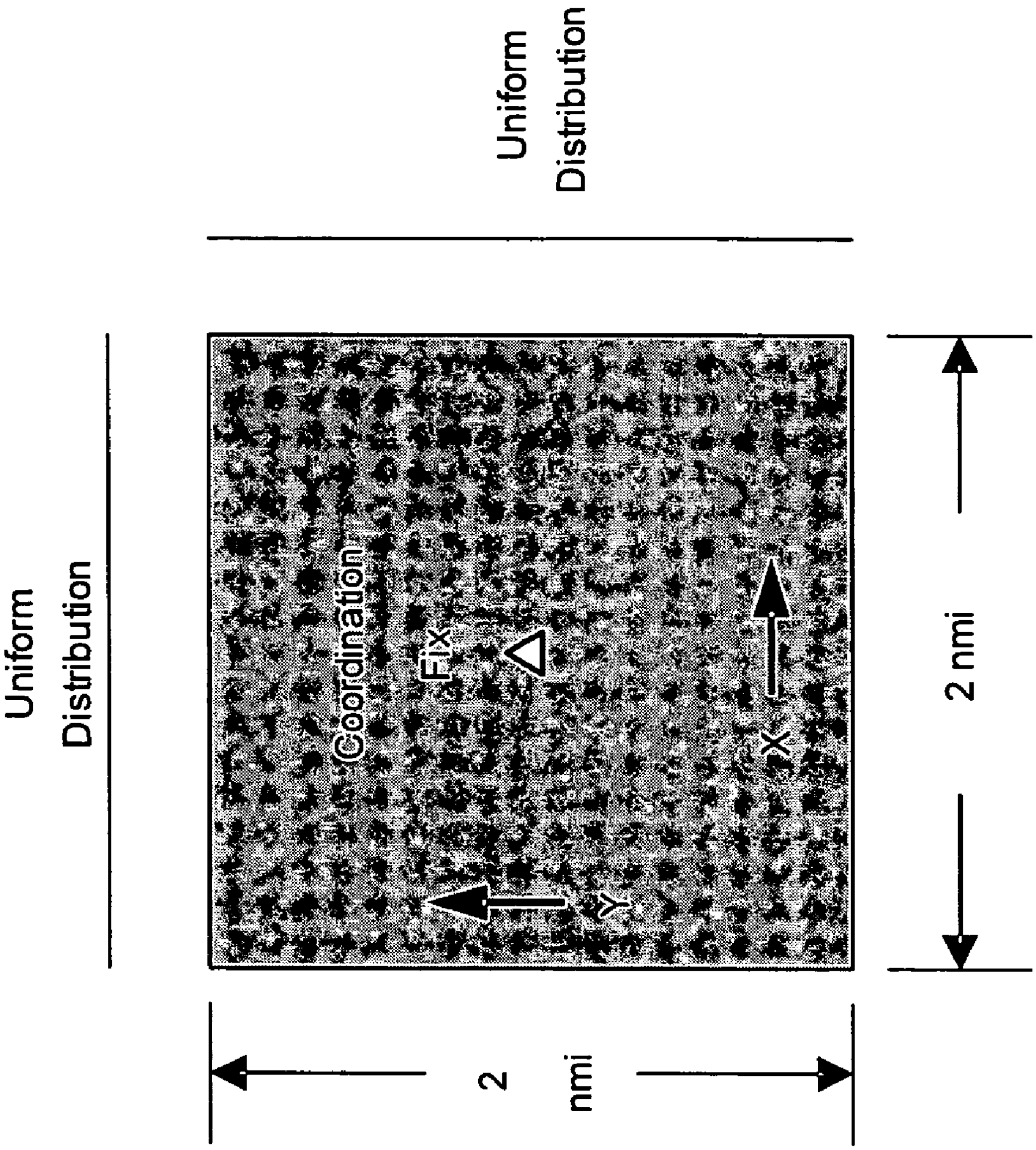
FIG. 4 shows the simulation of lateral route deviations.

After setting the route fixes, the lateral deviation model 917 begins to generate a ground track for the flight, consisting of a series of X, Y points. It simulates navigational error by choosing random variations in how close the flight comes to each fix. If the first fix is a departure airport, the initial deviation is set to zero. Otherwise, the first fix is assumed to be a coordination fix, and the first simulated track point is set by selecting a random deviation from this fix. Specifically, the X and Y coordinates for the first track point are chosen from a uniform distribution centered on the coordination fix and extending one nautical mile in either direction. This is illustrated in FIG. 4. For each subsequent fix, a raw lateral deviation value $\epsilon$ is first selected from a zero-mean Laplace distribution, whose probability density is given by the following formula:

$$\text{Probability Density} = \frac{1}{2\lambda}\exp\left(-\frac{|\varepsilon|}{\lambda}\right)$$

Figure 5:
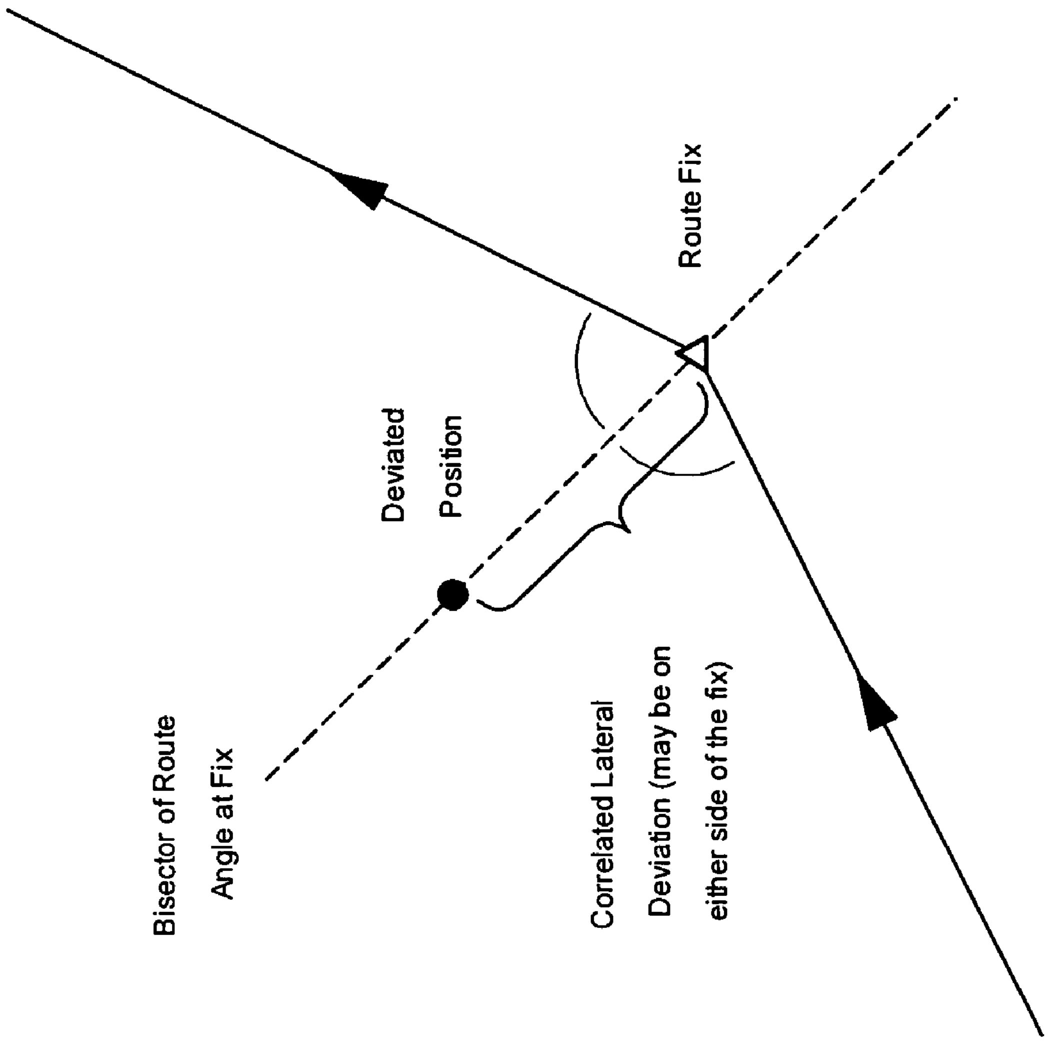
FIG. 5 shows selection of the initial track point near a coordination fix.

For selecting the raw deviation value, the $\lambda$ parameter is set to 2.35 nautical miles, producing a standard deviation of 3.32 nautical miles. (This raw deviation is a signed value that can be on either side of the fix.) Values more than ±3 standard deviations from the mean are not allowed. The simulated deviation from the fix position is then obtained by adding 20% of the raw value to 80% of the simulated deviation at the previous fix. In this way, the simulated deviations are serially correlated from one fix to the next in a manner typical of actual flight tracks. This simulated lateral deviation is positioned on an imaginary line bisecting the route angle at the fix, as illustrated in FIG. 5.

Once the lateral deviation model 917 has determined the deviated position for a fix, it "flies" the aircraft toward this position, generating track points that are two nautical miles apart, until it decides that the fix has been passed. It then progresses to the following fix. A fix is considered to have been passed if either of the following conditions is true:

A. The current track point is within $\sqrt{3}$ nautical miles of the deviated fix position B. The current track point is within 12 nautical miles of the deviated fix position, but is farther from the deviated position than the previous track point Condition B is primarily intended to handle sharp route bends in a robust manner. The lateral deviation model 917 also deals with bends in the route by use of an embedded turn rate model. Rather than flying the aircraft directly from one deviated fix position to the next ("connecting the dots"), this model establishes an upper limit of about 23° of heading change between successive track points. Essentially, the turn rate model assumes a coordinated turn at a velocity of 400 knots and a bank angle of 25°. It further assumes that the aircraft rolls into the 25° bank angle at a rate of 5 degrees/second. Internally, the algorithm that implements this model works by stepping the aircraft through a turn in one-second increments (18 steps per track point).

It is generally assumed that the modeled flights are operating within a limited air traffic control region whose X, Y bounds are known. After the lateral deviation model generates a track point, it compares the coordinates of that point to the specified air traffic control bounds. If the simulated track has moved more than a parameter distance outside those bounds, then the track is terminated at that point. If, on the other hand, the last route fix is reached and the track has not yet terminated, then this last fix may be treated in one of two ways: (1) if the last fix is the destination airport, then the deviation at the fix is set to zero. Otherwise, (2) a random deviation is chosen in the same manner as for the other fixes, and the track is terminated as soon as the fix is passed.

The skipped fix model 918 represents the statistical probability that an aircraft will fly directly to a downstream fix without a flight plan amendment being entered into the ATC computer system. The skipped fix model 918 applies a logistic distribution to determine whether a given fix will be skipped and, if so, how many succeeding fixes will also be skipped. Mathematically, this is expressed as:

$$\text{Prob}(\#\ \text{fixesskipped} < k) = [1 + 0.0384\ \exp(-0.607\ k)]^{-}$$

At any given fix along a route, the probability that one or more fixes will be skipped is about 2%. With decreasing probability, multiple fixes may be skipped.

The surveillance error model 920 represents surveillance measurement errors. This model is intended to be applied after all other spatial models. In other words, it could be used to apply measurement error on top of the modeled "true" flight path.

In this model, the magnitudes of surveillance errors are represented by a zero-mean Laplace distribution, whose probability density function was given previously. For setting the $\lambda$ parameter, this model has the following options:

Radar noise alone: $\lambda$=0.11 nautical miles (standard deviation=0.16 nautical miles)

Radar+tracker noise: $\lambda$=0.20 nautical miles (standard deviation=0.28 nautical miles)

Values more than ±3 standard deviations from the mean are not allowed.

The longitudinal models 912 include airspeed models for each phase of flight: climb (922), cruise (924), and descent (926). These models are described below.

The climb airspeed model 922 is used to generate a typical airspeed profile during the climb phase of flight, with airspeed varying in accordance with altitude. The climb airspeed model 922 includes the effect of the airspeed limit below 10,000 ft. During climb, airspeed is calculated as a function of the current altitude, as well as the filed cruise altitude and the modeled cruise airspeed (which is chosen as described below). For each flight, a speed-limit "breakpoint" consisting of a speed/altitude pair, is chosen randomly. The breakpoint altitude $z_b$ is selected from a log-normal distribution with a mean value ($\mu$) of 9580 ft and a standard deviation ($\sigma$) of 1228 ft. The probability density of the log-normal distribution is given by the formula:

$$\text{Probability Density} = \frac{1}{Bz_b\sqrt{2\pi}}\exp\left(-\frac{1}{2}\left(\frac{\ln(z_b)-A}{B}\right)^2\right)$$

where the A and B parameters are defined as:

$$B = \sqrt{\ln\left(\frac{\sigma^2}{\mu^2}+1\right)}$$

$$A = \ln(\mu) - \frac{B^2}{2}$$

Breakpoint altitudes below 7000 ft and above 13000 ft are not allowed.

The breakpoint airspeed $s_b$ is chosen from a normal (Gaussian) distribution with a standard deviation of 14.33 knots and a mean value that is a linear function of the breakpoint altitude, as follows:

$$\text{mean value (knots)}=0.006172\ z_b+233.7$$

The minimum and maximum acceptable values for the breakpoint airspeed are 250 knots and 340 knots, respectively.

After the breakpoint has been chosen, airspeed at any point is then modeled as a quadratic function of altitude, using either a single parabolic curve or two parabolic curves—one below the breakpoint and one above.

Coefficients for these curves are chosen so as to provide a continuous transition from a reasonable departure speed at very low altitudes to the modeled cruise airspeed at the cruise altitude, and also to fit the empirical data. First, the following formulas are used to determine the parabolic peak altitude $z_p$ and the zero-altitude airspeed $s_0$ as a function of $z_c$, the filed cruise altitude:

$$z_p=z_c\cdot\max(0.8,\ \min(1.262-1.104\times10^{-5}\cdot z_c,\ 1))$$

$$s_0=\max(125,\ \min(103.0+0.002951\cdot z_p,\ 225))$$

Next, the "initial" airspeed curve is defined by the following quadratic formula:

$$s_i(z) = s_c - (s_c - s_0)\left(\frac{z_p - z}{z_p}\right)^2$$

where z is altitude and $s_c$ is the modeled cruise airspeed. If the value of $s_i$ at the breakpoint altitude, $s_i(z_b)$, is less than or equal to the breakpoint airspeed $s_b$, then the initial airspeed curve passes under or through the breakpoint, and only one airspeed curve, that specified by the formula above, is used to determine airspeed as a function of altitude. Note that airspeed is not allowed to exceed the cruise airspeed ($s_i \leqq s_c$), even if altitude (z) is greater than the parabolic peak altitude ($z_p$).

In cases where the value of $s_i$ at the breakpoint altitude is greater than the breakpoint airspeed, then two airspeed curves are required. In addition to the initial airspeed curve specified above, a "final" airspeed $s_f$ curve is defined by the following quadratic formula:

$$s_f(z) = s_c - (s_c - s_b)\left(\frac{z_p - z}{z_p - z_b}\right)^2$$

Figure 6:
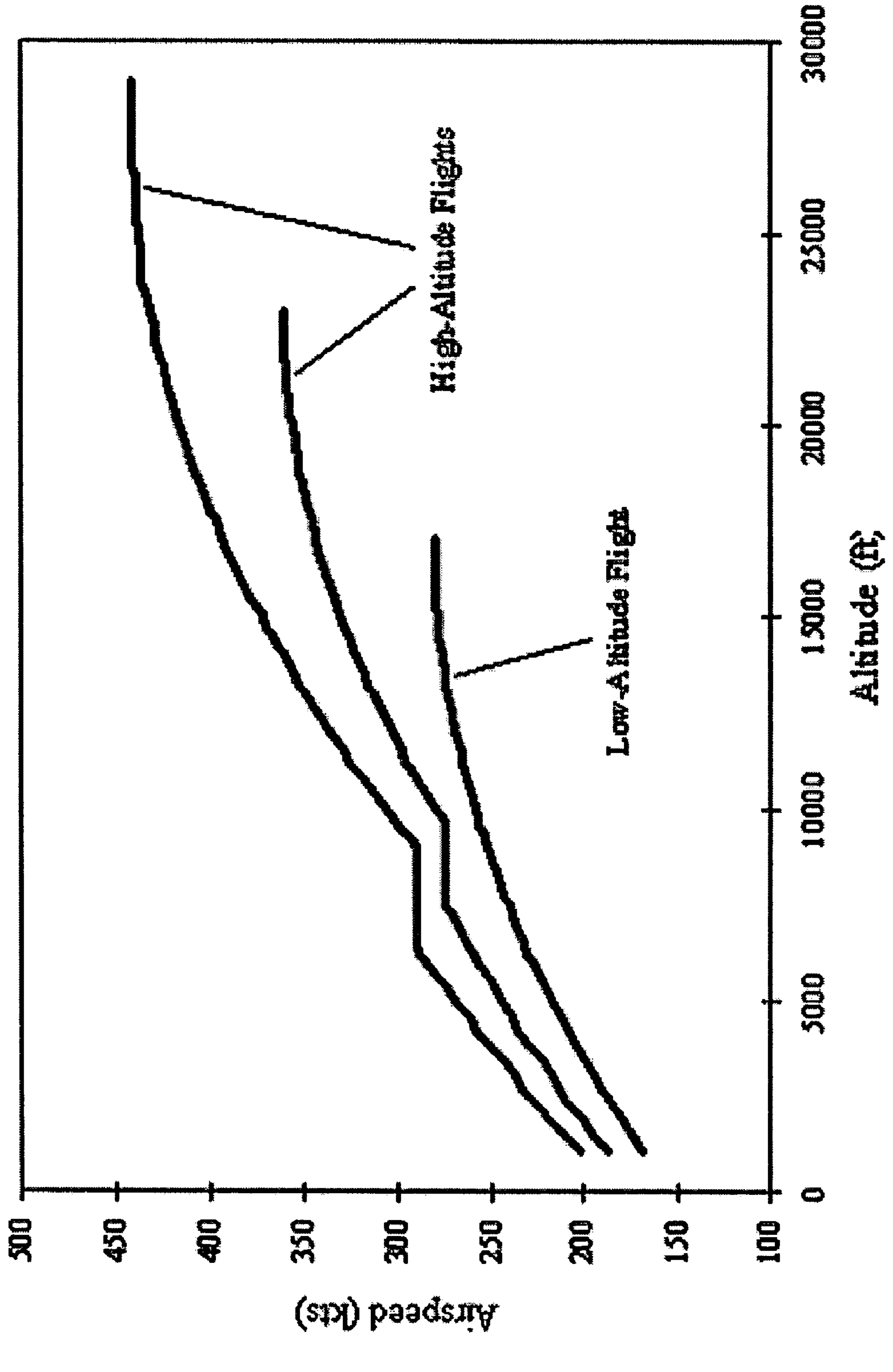
FIG. 6 illustrates the positioning of lateral deviation at each route fix.

When two airspeed curves are required, the initial curve is used for altitudes below $z_b$, and the final curve is used for altitudes above $z_b$. When the initial curve is being used, airspeed is not permitted to exceed $s_b$, and when the final curve is applied, the maximum allowable value of airspeed is $s_c$. FIG. 6 shows several composite airspeed curves produced by the above models. The low altitude flight uses a single curve, while high altitude flights are defined by two curves.

The cruise airspeed model 924 is used to select the airspeed to be modeled during the cruise phase of flight. This model is based upon typical differences between filed airspeed and actual airspeed during cruise.

For each flight, a constant, randomly selected cruise airspeed is modeled. This airspeed is selected from a normal distribution with a mean value close to the filed airspeed and a standard deviation in the range of 15-26 knots. The actual distribution parameters vary with the cruise altitude, as shown in Table 1. Values that are more than three standard deviations from the mean are not allowed.

TABLE 1

| Altitude Band | Modeled Cruise Airspeed - Filed Airspeed | |
|---|---|---|
| (FL) | Mean (knots) | Std. Dev. (knots) |
| 0–85 | −3 | 15 |
| 86–135 | −4 | 18 |
| 136–185 | −7 | 21 |
| 186–235 | −3 | 24 |

TABLE 1-continued

| Altitude Band | Modeled Cruise Airspeed - Filed Airspeed | |
|---|---|---|
| (FL) | Mean (knots) | Std. Dev. (knots) |
| 236–285 | −1 | 26 |
| 286–335 | 4 | 19 |
| 336–385 | −4 | 20 |
| 386–600 | −14 | 20 |

The descent airspeed model 926 is similar to the climb airspeed model 922, and is used to generate a typical airspeed profile (airspeed vs. altitude) during the descent phase of flight.

This model includes the effect of the airspeed limit below 10,000 ft. During descent, airspeed is calculated as a function of the current altitude, as well as the filed cruise altitude and the modeled cruise airspeed. For each flight, a speed-limit breakpoint is chosen randomly, using the same formulas as for the climb phase, but with slightly different parameters. The breakpoint altitude $z_b$ is selected from a log-normal distribution with a mean value (μ) of 10,344 ft and a standard deviation (σ) of 1307 ft. Breakpoint altitudes below 7000 ft and above 13000 ft are not allowed. The breakpoint airspeed $s_b$ is chosen from a normal distribution with a standard deviation of 19.65 knots and mean value that is a linear function of the breakpoint altitude, as follows:

$$\text{mean value (knots)}=0.005530\, z_b+228.2$$

The minimum and maximum acceptable values for the breakpoint airspeed are 250 knots and 340 knots, respectively.

After the breakpoint has been chosen, airspeed at any point is then modeled as a linear fractional function of altitude, using either a single curve or two curves—one above the breakpoint and one below. First, the following formulas are used to determine the zero-altitude airspeed $s_0$ and three “shape” parameters $A_s$, $A_l$, and $A_u$. Each of these is a function of $z_c$, the filed cruise altitude, and $s_c$, the modeled cruise altitude:

$$s_0=\max(120, \min(-781.4+2.128\cdot s_c+3.121\times10^{-4}\cdot z_c, 225))$$

$$A_s=\max(1, 9.935-0.02455\cdot s_c+1.336\times10^{-4}\cdot z_c)$$

$$A_l=\max(1, 9.333-0.01708\cdot s_c-6.6\times10^{-6}\cdot z_c)$$

$$A_u=\max(1, 0.601-0.000119\cdot s_c+1.056\times10^{-4}\cdot z_c)$$

Next, the “single” airspeed curve $s_c$ is defined by the following linear-fractional formula:

$$s_s(z) = s_0 + \frac{A_s(s_c - s_0)z}{(z_c - z) + A_s z}$$

where z is altitude. If the value of $s_s$ at the breakpoint altitude, $s_s(z_b)$, is less than or equal to the breakpoint airspeed $s_b$, then the single airspeed curve passes under or through the breakpoint, and only one airspeed curve, that specified by the formula above, is used to determine airspeed as a function of altitude. Otherwise, the formula for $s_s$ is not used, and two airspeed curves are required, as defined below. Note that regardless of which airspeed curves are used, airspeed is not allowed to exceed the cruise airspeed $s_c$.

If two airspeed curves are required for descent, then two new airspeed curves are defined by the following linear-fractional formulas. The “lower” airspeed $s_c$ curve is defined as:

$$s_l(z) = s_0 + \frac{A_l(s_b - s_0)z}{(z_b - z) + A_l z}$$

This formula for $s_l$ gives the airspeed for all altitudes below $z_b$. The “upper” airspeed $s_u$ curve is defined as:

$$s_u(z) = s_b + \frac{A_u(s_c - s_b)(z - z_b)}{(z_c - z) + A_u(z - z_b)}$$

This formula for $s_u$ gives the airspeed for all altitudes between $z_b$ and $z_c$.

The vertical models 914 include models for altitude during the climb (928) and descent (930) phases of flight, plus a model for altitude transitions (932) during the cruise phase. Each of these models is described below.

The climb altitude model 928 is used to generate a typical altitude profile (altitude vs. along-track distance) during the climb phase of flight.

The first step is to select the mean climb gradient for a flight. This value is selected as a random deviation from a standard value based on aircraft type. Specifically, the mean gradient is chosen from a triangular distribution with a lower limit of 66% of the standard value and an upper limit of 136% of the standard value.

Once the mean gradient has been selected, altitude during a climb is calculated as a linear fractional function of the distance from the origin. The shape of the climb gradient curve depends on the cruise altitude. The curve is defined by the following formulas:

$$f_d = \frac{d\cdot \bar{g}}{z_c}$$

$$f_z = \frac{A\cdot f_d}{(f_d + A - 1)}$$

$$z = f_z\cdot z_c$$

where $F_d$=fraction of along-track climb distance d=current along-track distance from orgin airport $\bar{g}$=mean climb gradient $z_c$=cruise altitude A=shape z=current altitude The shape parameter, A, is selected from Table 2 below, based on the cruise altitude.

TABLE 2

Shape Parameter for Climb Gradient Curves

| Cruise Altitude (ft) | Shape Parameter A |
|---|---|
| 0–4,999 | 2.8473 |
| 5,000–9,999 | 2.6552 |
| 10,000–14,999 | 2.4639 |

TABLE 2-continued

| Shape Parameter for Climb Gradient Curves | |
|---|---|
| Cruise Altitude (ft) | Shape Parameter A |
| 15,000–19,999 | 2.5265 |
| 20,000–24,999 | 2.1996 |
| 25,000–29,999 | 1.9999 |
| 30,000–34,999 | 1.8088 |
| 35,000–39,999 | 1.7014 |
| 40,000 and above | 1.5920 |

Starting at the first track point, the gradient formulas are applied to determine the aircraft's altitude from one track point to the next. At each step, the distance and direction to the next track point are first determined. (In practice, this is done in conjunction with the climb airspeed model 922.) The process ends when the cruise altitude is reached.

The cruise altitude-transition model 932 is used to model typical climb and descent rates, plus acceleration and deceleration rates, for transitions from one altitude to another during the cruise phase of flight (in response to an altitude amendment, for example).

To simulate an altitude transition, the model chooses three parameters: a target climb or descent rate, an acceleration rate, and a deceleration rate, as described below. Thereafter, the aircraft is modeled as accelerating to the target rate, maintaining the target rate for an appropriate period of time, and then decelerating to level off at the new cruise altitude. (Note that in exceptional circumstances, the target rate may not be achieved before deceleration begins.)

The target vertical rate for an altitude transition is chosen randomly, based on the aircraft type, the altitude, and the direction of the transition (up or down). The mean vertical rate for the particular aircraft type is determined first. If the aircraft is climbing, the mean rate is determined as a linear function of altitude; the slope and intercept for this relationship are found in a cruise-transition parameter table, based on aircraft type. If the aircraft is descending, the mean rate comes directly from the parameter table, based on aircraft type, and does not vary with altitude. Next, the standard deviation in vertical rate for the aircraft type is determined. If the aircraft is climbing, the standard deviation is modeled as a fixed fraction of the mean climb rate, with the fractional value being selected from the parameter table, again based on aircraft type. If the aircraft is descending, the standard deviation value comes directly from the parameter table as a function of the aircraft type. Once the mean vertical rate and standard deviation have been determined, the actual target rate to be modeled is chosen randomly, using a log-normal distribution with the specified mean and standard deviation. Values less than 325 ft/min or greater than three standard deviations above the mean are not allowed.

Acceleration and deceleration rates for altitude transitions are chosen randomly as a function of the target vertical rate and the direction of the transition. Both rates are selected in a similar manner. First, the ratio of the acceleration/deceleration rate to the target vertical rate is determined. This ratio is selected randomly, using a log-normal distribution. The mean, standard deviation, minimum, and maximum values for the distribution come from the parameter table, based on the direction of the transition. These values are shown below in Table 3. Then, the acceleration or deceleration rate is found by multiplying the selected ratio by the target vertical rate.

TABLE 3

| Acceleration/Deceleration Ratios for Altitude Transitions | | | | |
|---|---|---|---|---|
| Ratio | Mean | Standard Deviation | Minimum | Maximum |
| Climb acceleration | 0.02040 | 0.005260 | 0.01111 | 0.03333 |
| Climb deceleration | 0.01600 | 0.004320 | 0.00833 | 0.02857 |
| Descend acceleration | 0.01703 | 0.004209 | 0.00952 | 0.02857 |
| Descend deceleration | 0.01668 | 0.004175 | 0.01053 | 0.03333 |

The descent altitude model 930 is similar to the climb altitude model, and is used to generate a typical altitude profile (altitude vs. distance to destination) during the descent phase of flight.

The first step is to select a mean descent gradient for a flight. This value is selected as a random deviation from a standard gradient value based on aircraft type. Specifically, the mean gradient is chosen as a fractional deviation from the standard value, using a logistic distribution with a standard deviation of about 13%. The probability density function for a logistic distribution is given by:

$$\text{Probability Density} = \frac{\exp\left(\frac{A-f}{B}\right)}{B\left[1+\exp\left(\frac{A-f}{B}\right)\right]}$$

where f is the random deviation fraction and the A and B parameters are −0.02842 and 0.08909, respectively. Only values in the middle 96% of the distribution (approximately −0.3751 to +0.3183) are allowed for f. The mean descent gradient $\bar{g}$ is then calculated as:

$$\bar{g}=\bar{g}_a\cdot(1+f)$$

where $g_a$ is the standard gradient value for the particular aircraft type.

Once the mean gradient has been selected, altitude during a descent is calculated as a Gompertz function of the direct horizontal distance to the destination. The shape of the descent gradient curve depends on the cruise altitude. The curve is defined by the following formulas:

$$f_d = \frac{d\cdot g}{z_c}$$

$$f_z = A\cdot\exp(-B\cdot\exp(-C\cdot f_d))+D$$

$$z = f_z\cdot z_c$$

where $f_d$=fraction of descent distance d=current horizontal distance to destination airport $z_c$=cruise $f_z$=fraction of cruise altitude A,B,C,D=shape parameters z=current altitude The shape parameters are selected from Table 4 below, based on the cruise altitude.

TABLE 4

Shape Parameters for Descent Gradient Curves

| Cruise Altitude (ft) | Shape Parameter A | B | C | D |
|---|---|---|---|---|
| 0–4,999 | 1.8234 | 1.5231 | 1.7452 | −0.39754 |
| 5,000–9,999 | 1.8523 | 2.0197 | 1.6277 | −0.24579 |
| 10,000–14,999 | 1.4454 | 1.9509 | 2.3746 | −0.20546 |
| 15,000–19,999 | 2.0435 | 1.1902 | 1.6383 | −0.62156 |
| 20,000–24,999 | 2.2554 | 1.1042 | 1.4653 | −0.74763 |
| 25,000–29,999 | 2.1898 | 1.0666 | 1.5691 | −0.75366 |
| 30,000–34,999 | 2.0097 | 1.1507 | 1.7212 | −0.63594 |
| 35,000–39,999 | 2.0159 | 1.1168 | 1.7487 | −0.65986 |
| 40,000 and above | 1.8156 | 1.5850 | 1.7334 | −0.37211 |

When using the descent altitude model 930, the top-of-descent point is defined as the point where a flight's cruise altitude (relative to the elevation of the destination airport), divided by the horizontal distance to the destination airport, equals the mean descent gradient. Starting at the top-of-descent point, the distance and direction from one track point to the next is determined. (In practice, this is done in conjunction with the descent airspeed model 926.) At each new track point, the distance to the destination airport is calculated, and then the gradient formulas are applied to determine the altitude at the new track point. The process ends when the destination airport is reached.

Table 5 below shows sample aircraft-specific flight modeling parameters for two aircraft (Boeing 747 and MD80) that can be used by the vertical models.

TABLE 5

Example of Aircraft-Specific Flight Modeling Parameters

| | Climb and Descent Parameters | | Parameters for Altitude Transitions During Cruise | | | | |
|---|---|---|---|---|---|---|---|
| | | | Mean Climb Rate as a Function of Altitude (Linear Relationship) | | Climb Rate Variability | Descent Rate Parameters | |
| | Mean Climb | Mean Descent | | | Standard Deviation of | Mean | Standard |
| Aircraft Type | Gradient (ft/nmi) | Gradient (ft/nmi) | Intercept (ft/s) | Slope (ft/s/ft) | Climb Rate ÷ Mean Rate | Rate (ft/s) | Deviation (ft/s) |
| B747 | 269.9 | 339.7 | 35.27 | −0.0005570 | 0.3067 | 17.76 | 7.745 |
| MD80 | 327.8 | 332.8 | 41.78 | −0.0007967 | 0.2796 | 20.85 | 8.086 |

The response-time models 916 include a route amendment response-time model 934 and an altitude amendment response-time model 936. These two models are intended to be applied in somewhat different ways, as explained below. Conceptually, either of these models could be applied to any change in a flight's planned trajectory.

The route amendment response-time model 934 represents typical controller/pilot delays in posting and responding to a change in the cleared route of flight.

This model simulates the total delay between the time a resolution trial plan is presented to the air traffic controller by a decision support tool, and the time at which the subject aircraft begins to maneuver in response to the resolution (assuming the controller decides to accept the proposed resolution). This delay time thus includes the time required for the controller to select a resolution and enter it into the ATC computer system, plus the time required by the pilot to receive and respond to the controller's instructions. The delay time is randomly selected from a normal distribution with a mean value of 50 seconds and a standard deviation of 15 seconds. Note that in real-world traffic data, very large delays (two minutes or more) are occasionally observed. Such outliers are not modeled by the route amendment response-time model.

The altitude amendment response-time model 936 represents typical differences between the time an altitude amendment is posted (entered into the ATC computer system) and the time at which the aircraft begins to change altitude to comply with the amendment.

This model is different from the route amendment response-time model 934 in that it includes a component representing very large response delays like those occasionally observed in real-world traffic data. (The modeling of such outliers may not be appropriate for certain applications.) The altitude amendment response-time model 936 selects random delay times from a double-normal distribution. A double-normal distribution contains two components, each of which is a normal distribution. A fixed probability parameter controls which component is selected on a given invocation. A double-normal distribution suggests that the underlying population consists of two different classes, and a single observation may belong to either class with a certain probability. This type of distribution was selected to represent response delays because it fit the empirical air traffic data better than any other type of distribution. Its use is not meant to imply that there are necessarily two distinct classes of flights.

The first component of this distribution represents more typical response times. The second component represents very slow response times that can be considered outliers. Note that delay times chosen by the altitude amendment response-time model can occasionally be negative. This is by design, and represents cases where the pilot receives an amendment by radio and begins to respond before the amendment is actually posted to the ATC computer system. The probability density function for the double-normal distribution is given by:

$$\text{Probability Density} = \frac{p}{\sigma_1\sqrt{2\pi}}\exp\left[-\frac{1}{2}\left(\frac{t-\mu_1}{\sigma_1}\right)^2\right] + \frac{(1-p)}{\sigma_2\sqrt{2\pi}}\exp\left[-\frac{1}{2}\left(\frac{t-\mu_2}{\sigma_2}\right)^2\right]$$

where t is response time and the specific parameter values are:

$\mu_1$=9.37 sec.

$\sigma_1$=15.08 sec.

$\mu_2$=109.51 sec.

$\sigma_2$=55.06 sec.

P=0.8506

Figure 7:
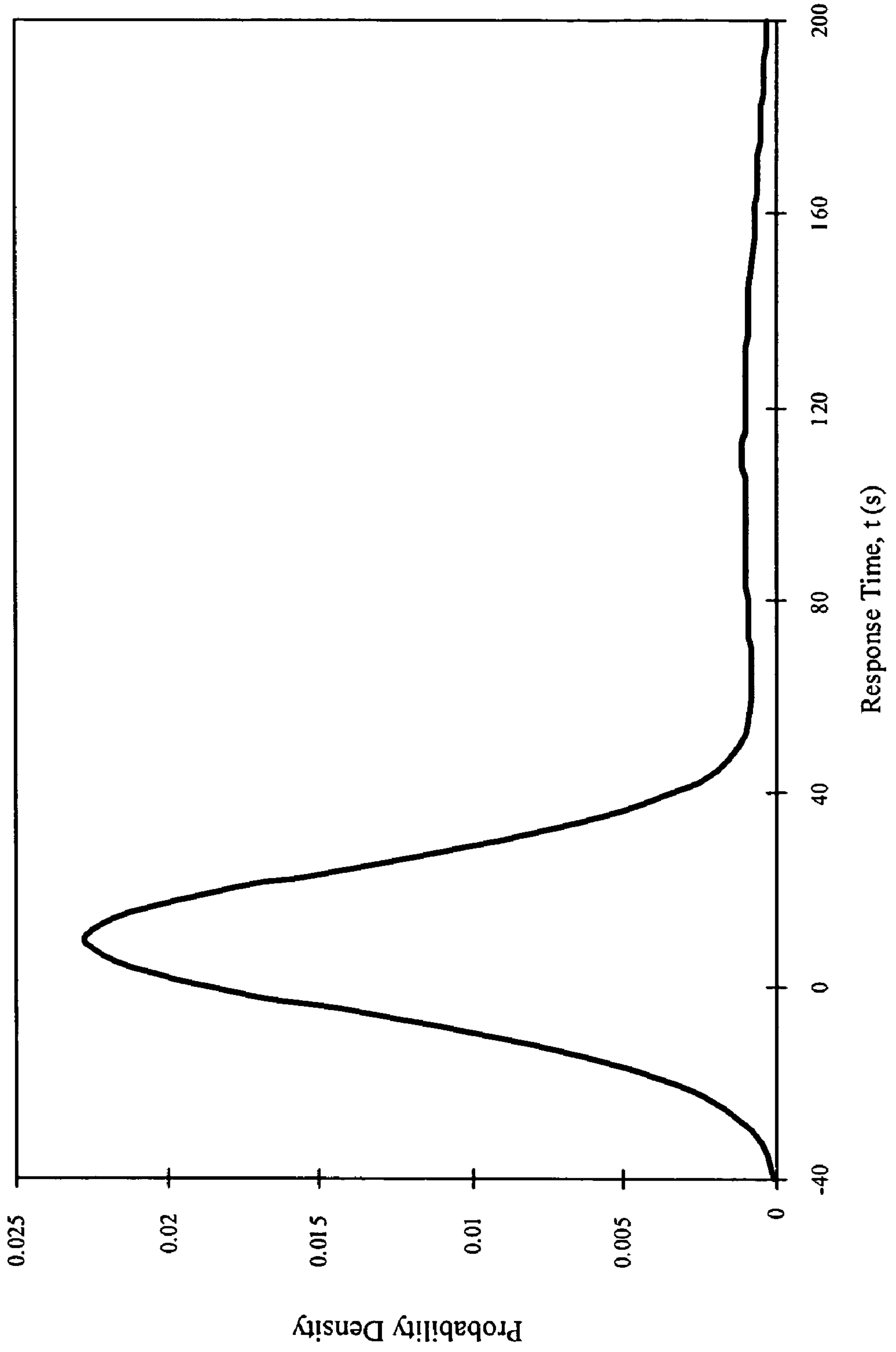
FIG. 7 illustrates a distribution used by an altitude amendment response-time model.

FIG. 7 is a graph of the above distribution.

The present invention also includes a method used for developing the specific flight models described above. Other flight models might also be developed through application of the same method. In summary, the model development process comprises the following steps:

A. Represent the route for each filed flight plan as a series of navigational fixes, defining a reference trajectory. Save other relevant information from the flight plan, including the aircraft type, origin, destination, cruise altitude, and filed airspeed. If the route is altered later by a flight plan amendment, update the reference trajectory to reflect the cleared route actually flown.

B. Smooth each flight's reported track positions, as appropriate, to derive the best estimate of the aircraft's true position at the time of each report. Then, based on the altitude history of the track, apply rules to identify the three phases of flight: Climb, Cruise, and Descent.

C. In each flight dimension (lateral, longitudinal, and vertical), compare a flight's true position to its expected position based on the reference trajectory, forecast wind vector, and associated flight parameters. Develop stochastic models, using appropriate statistical distributions, that accurately represent the observed deviations from the reference trajectory. The derived values for certain flight parameters—mean climb and descent gradients, for example—may depend on aircraft type. For the Climb and Descent phases of flight, use curve-fitting techniques to develop models representing typical altitude and airspeed profiles as a function of the distance from origin or destination.

D. As required, develop response models to represent typical delay times between the posting of a flight plan amendment and the beginning of an aircraft maneuver in response to the amendment.

E. Incorporate the individual flight models into a software application, as required. Possible applications include generating synthetic flight tracks from specified flight plans and amendments, estimating the distribution of minimum separation distances between flights on specified routes, and similar tasks. Ultimately, the output of the process is a set of flight models that represent realistic variations in aircraft flight parameters or flight paths.

The new process requires that the analyst be skilled in the processing of large data sets and knowledgeable in the areas of flight physics and statistical modeling. Proper application of the process requires many hours of air traffic data, preferably containing track reports at 12-second intervals (or less) for each individual flight, along with wind forecast data for the appropriate time period and geographical location. The level of detail in the derived flight models can vary, depending on the intended application of the models.

Figure 8:
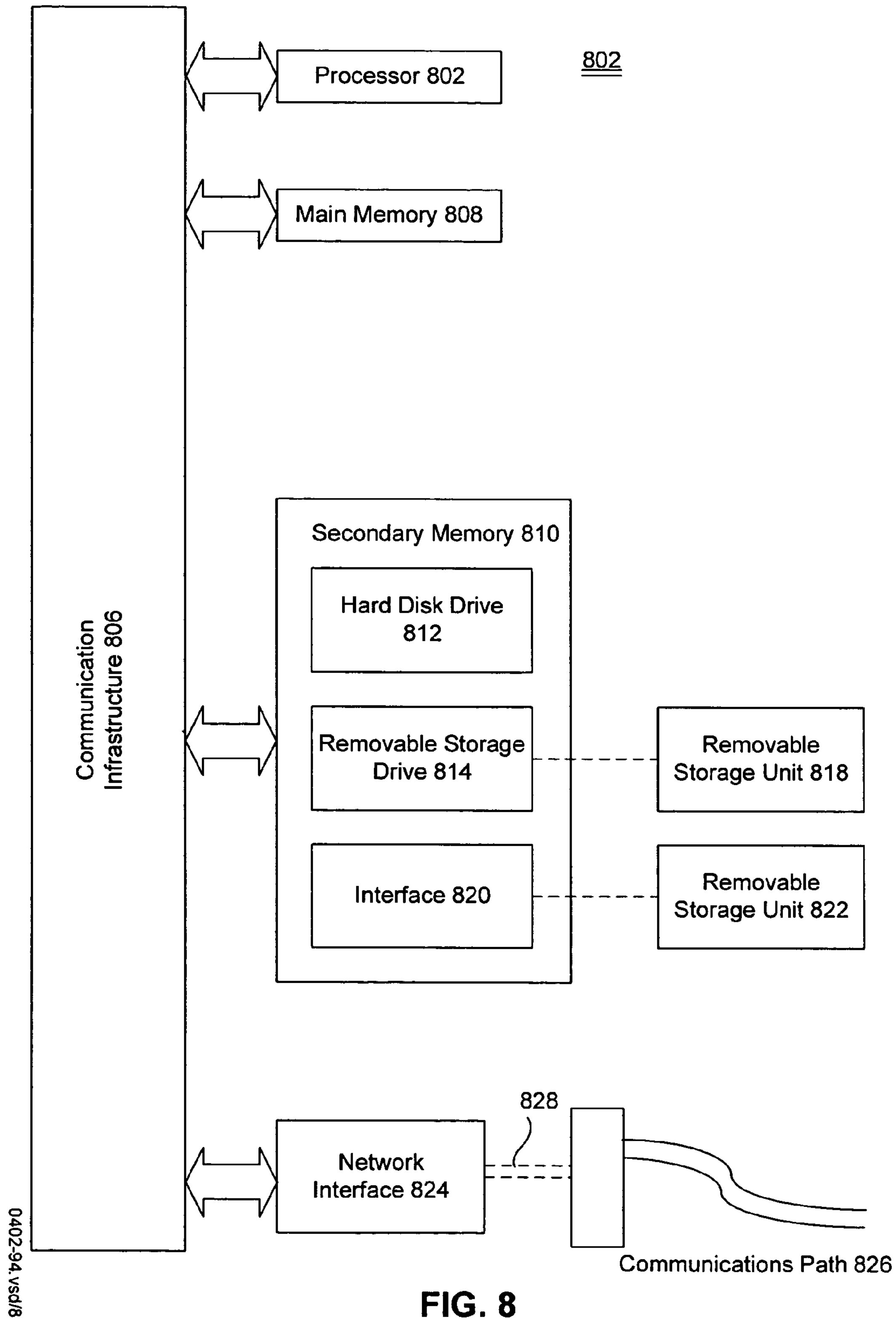
FIG. 8 illustrates an example of a computer architecture that may be used in the present invention.

An example of a computer system 802 that may be used for implementing the present invention is illustrated in FIG. 8. The computer system 802 includes one or more processors, such as processor 801. The processor 801 is connected to a communication infrastructure 806, such as a bus or network). Various software implementations are described in terms of this exemplary computer system. After reading this description, it will become apparent to a person skilled in the relevant art how to implement the invention using other computer systems and/or computer architectures.

Computer system 802 also includes a main memory 808, preferably random access memory (RAM), and may also include a secondary memory 810. The secondary memory 810 may include, for example, a hard disk drive 812 and/or a removable storage drive 814, representing a magnetic tape drive, an optical disk drive, etc. The removable storage drive 814 reads from and/or writes to a removable storage unit 818 in a well known manner. Removable storage unit 818 represents a magnetic tape, optical disk, or other storage medium that is read by and written to by removable storage drive 814. As will be appreciated, the removable storage unit 818 can include a computer usable storage medium having stored therein computer software and/or data.

In alternative implementations, secondary memory 810 may include other means for allowing computer programs or other instructions to be loaded into computer system 802. Such means may include, for example, a removable storage unit 822 and an interface 820. An example of such means may include a removable memory chip (such as an EPROM, or PROM) and associated socket, or other removable storage units 822 and interfaces 820 which allow software and data to be transferred from the removable storage unit 822 to computer system 802.

Computer system 802 may also include one or more communications interfaces, such as communications interface 824. Communications interface 824 allows software and data to be transferred between computer system 802 and external devices. Examples of communications interface 824 may include a modem, a network interface (such as an Ethernet card), a communications port, a PCMCIA slot and card, etc. Software and data transferred via communications interface 824 are in the form of signals 828 which may be electronic, electromagnetic, optical or other signals capable of being received by communications interface 824. These signals 828 are provided to communications interface 824 via a communications path (i.e., channel) 826. This channel 826 carries signals 828 and may be implemented using wire or cable, fiber optics, an RF link and other communications channels. In an embodiment of the invention, signals 828 comprise data packets sent to processor 801. Information representing processed packets can also be sent in the form of signals 828 from processor 801 through communications path 826.

The terms "computer program medium" and "computer usable medium" are used to generally refer to media such as removable storage units 818 and 822, a hard disk installed in hard disk drive 812, and signals 828, which provide software to the computer system 802.

Computer programs are stored in main memory 808 and/or secondary memory 810. Computer programs may also be received via communications interface 824. Such computer programs, when executed, enable the computer system 802 to implement the present invention as discussed herein. In particular, the computer programs, when executed, enable the processor 801 to implement the present invention. Where the invention is implemented using software, the software may be stored in a computer program product and loaded into computer system 802 using removable storage drive 814, hard drive 812 or communications interface 824.

It should also be appreciated that various modifications, adaptations, and alternative embodiments thereof may be made within the scope and spirit of the present invention. The invention is further defined by the following claims.

What is claimed is:

1. A method of generating aircraft routes, comprising:

identifying a planned route for an aircraft from an origin to a destination;

generating a statistical distribution representative of variations of at least one aircraft flight parameter along the planned route based on data from previous actual flights that used the planned route;

adjusting the planned route based on at least the statistical distribution to generate a modified route for the aircraft from the origin to the destination; and communicating the modified route to a user.

2. The method of claim 1, wherein the at least one aircraft flight parameter is represented as a normal distribution.

3. The method of claim 1, wherein the at least one aircraft flight parameter is represented as a Laplacian distribution.

4. The method of claim 1, wherein the at least one aircraft flight parameter is represented as a logistic distribution.

5. The method of claim 1, wherein the at least one aircraft flight parameter includes one or more of lateral position, longitudinal position, descent altitude, climb airspeed, descent airspeed, cruise airspeed, climb altitude, cruise altitude transition, forecast wind vector and response time.

6. The method of claim 1, further comprising at least one of: (i) testing how well the modified route is laid out; and (ii) determining whether the modified route has better merit than the planned route.

7. The method of claim 1, wherein the adjusting step is performed iteratively.

8. The method of claim 1, wherein the modified route reduces proximity alerts.

9. The method of claim 1, further comprising identifying conformance bounds for the planned route, wherein the adjusting step utilizes the conformance bounds to generate the modified route.

10. A system for generating aircraft routes, comprising:

means for identifying a planned route for an aircraft from an origin to a destination;

means for generating a statistical distribution representative of variations of at least one aircraft flight parameter along the planned route based on data from previous actual flights that used the planned route;

means for adjusting the planned route based on at least the statistical distribution to generate a modified route for the aircraft from the origin to the destination; and means for communicating the modified route to a user.

11. The system of claim 10, wherein the at least one aircraft flight parameter is represented as a normal distribution.

12. The system of claim 10, wherein the at least one aircraft flight parameter is represented as a Laplacian distribution.

13. The system of claim 10, wherein the at least one aircraft flight parameter is represented as a logistic distribution.

14. The system of claim 10, wherein the at least one aircraft flight parameter includes one or more of lateral position, longitudinal position, descent altitude, climb airspeed, descent airspeed, cruise airspeed, climb altitude, cruise altitude transition, forecast wind vector and response time.

15. The system of claim 10, further comprising means for at least one of: (i) testing how well a proposed flight path is laid out: and (ii) determining whether the modified route has better merit than the planned route.

16. The system of claim 10, wherein the adjusting means operates iteratively.

17. The system of claim 10, wherein the modified route reduces proximity alerts.

18. The system of claim 10, further comprising means for identifying conformance bounds for the planned route, wherein the means for adjusting uses the conformance bounds to generate the modified route.

19. A method of generating aircraft routes, comprising:

identifying a planned route for an aircraft from an origin to a destination;

generating a statistical distribution representative of variations of at least one aircraft flight parameter along the planned route based on data from previous actual flights that used the planned route;

adjusting the planned route based on at least the statistical distribution to generate a modified route for the aircraft from the origin to the destination that optimizes airspace use;

communicating the modified route to a user.

20. A method of generating aircraft routes, comprising:

identifying a planned route for an aircraft from an origin to a destination;

generating a statistical distribution representative of variations of at least one aircraft flight parameter along the planned route based on data from previous actual flights that used the planned route;

adjusting the planned route based on at least the statistical distribution to generate a modified route for the aircraft from the origin to the destination that minimizes flight delays; and communicating the modified route to a user.

21. A method of generating aircraft routes, comprising:

identifying a planned route for an aircraft from an origin to a destination;

generating a statistical distribution representative of variations of at least one aircraft flight parameter along the planned route based on data from previous actual flights that used the planned route;

adjusting the planned route based on at least the statistical distribution to generate a modified route for the aircraft from the origin to the destination that minimizes flight time; and communicating the modified route to a user.

22. A method of generating aircraft routes, comprising:

identifying a planned route for an aircraft from an origin to a destination;

generating a statistical distribution representative of variations of at least one aircraft flight parameter along the planned route based on data from previous actual flights that used the planned route;

adjusting the planned route based on at least the statistical distribution to compute a distribution of routes that allows for the generation of a modified route for the aircraft from the origin to the destination that reduces proximity alerts; and communicating the probabilistic distribution to a user.

23. The method of claim 22, further comprising optimizing one or more of conformance bounds, turn angle and thresholds for time to conflict notification for the modified route based on the distribution of routes.

* * * * *